United States Patent
Namba

(10) Patent No.: US 11,596,840 B2
(45) Date of Patent: Mar. 7, 2023

(54) RUBBER COMPOSITION FOR GOLF BALL, AND GOLF BALL

(71) Applicant: Bridgestone Sports Co., Ltd., Tokyo (JP)

(72) Inventor: Atsushi Namba, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 17/340,435

(22) Filed: Jun. 7, 2021

(65) Prior Publication Data
US 2021/0394025 A1 Dec. 23, 2021

(30) Foreign Application Priority Data
Jun. 23, 2020 (JP) .............................. JP2020-107913

(51) Int. Cl.
| | |
|---|---|
| A63B 37/06 | (2006.01) |
| A63B 37/00 | (2006.01) |
| C08F 236/06 | (2006.01) |
| C08F 222/02 | (2006.01) |
| C08K 5/14 | (2006.01) |
| C08F 220/36 | (2006.01) |

(52) U.S. Cl.
CPC ...... *A63B 37/0051* (2013.01); *A63B 37/0075* (2013.01); *C08F 220/36* (2013.01); *C08F 222/02* (2013.01); *C08F 236/06* (2013.01); *C08K 5/14* (2013.01)

(58) Field of Classification Search
CPC .......................... A63B 37/0051; A63B 37/005
USPC .......................................................... 473/371
See application file for complete search history.

(56) References Cited

U.S. PATENT DOCUMENTS

2018/0002519 A1* 1/2018 Comeau ............. A63B 37/0075

FOREIGN PATENT DOCUMENTS

JP 03-207709 A 9/1991

* cited by examiner

*Primary Examiner* — Raeann Gorden
(74) *Attorney, Agent, or Firm* — Sughrue Mion, PLLC

(57) ABSTRACT

A rubber composition for golf balls includes (A) a base rubber, (B) an acrylate ester or methacrylate ester containing an isocyanate group or a blocked isocyanate group, (C) diacrylic acid, dimethacrylic acid or a metal salt thereof, and (D) an organic peroxide. In a golf ball having a core formed of the rubber composition and a cover of one or more layers which encases the core, the rubber composition exhibits a spin rate-lowering effect on shots and can thus improve the flight performance of the ball.

6 Claims, 2 Drawing Sheets

RUBBER COMPOSITION FOR GOLF BALL, AND GOLF BALL

CROSS-REFERENCE TO RELATED APPLICATION

This non-provisional application claims priority under 35 U.S.C. § 119(a) on Patent Application No. 2020-107913 filed in Japan on Jun. 23, 2020, the entire contents of which are hereby incorporated by reference.

TECHNICAL FIELD

The present invention relates to a rubber composition for golf balls, and to a golf ball in which such a composition is used. More particularly, the invention relates to a is rubber composition for golf balls which can be advantageously used as the core material in golf balls having a core of at least one layer and a cover of at least one layer, and to a golf ball in which such a rubber composition is used.

BACKGROUND ART

Golf balls nowadays are predominantly either two-piece solid golf balls or three-piece solid golf balls. These golf balls generally have a structure in which a cover of one or more layers made of various types of resin materials encases a core made of a rubber composition. The core accounts for most of the golf ball volume and exerts a large influence on the properties of the ball such as rebound, feel at impact and durability.

The crosslinked structure of the rubber in the core is known to exert a large influence on the properties of the core and the properties of the ball. Methods for adjusting the crosslinked structure of rubber in the core include, for example, suitably regulating the compounding ingredients within the core-forming rubber composition and the vulcanization temperature and time. Also, with regard to the compounding ingredients within the core-forming rubber composition, additional methods include selecting the types of co-crosslinking agent and organic peroxide to be used and adjusting the contents thereof. In terms of co-crosslinking agents, the use of methacrylic acid, acrylic acid and metal salts of these is known in the field of golf balls. However, adjustments in the content of such co-crosslinking agents are targeted mainly at regulating the feel of the ball at impact by adjusting the core hardness, and are unable to satisfy the spin properties.

For example, JP-A H3-20770) describes art which includes specific amounts of a metal salt of acrylic acid and a metal salt of methacrylic acid in a core-forming rubber composition. However, the purpose of this prior art is to achieve improvements in both the feel and the durability of the ball; it is not art which aims to better achieve a desired internal hardness in the rubber molded material and a ball spin rate-lowering effect through, for example, selection of the types of ingredients included in the core-forming rubber composition.

Also, one important factor for increasing the distance traveled by a golf ball on shots with a driver is the amount of backspin incurred by the ball at the time of impact; it is known that the ball will not fly well when the amount of backspin is too high or too low. With most golfers, a loss of distance is often due to an excess amount of backspin. To avoid a loss of distance, balls that suppress the amount of backspin incurred at the time of impact are provided. These balls are all designed to be low compression and can be considerably deformed even with a small force, making drive shots having a suppressed spin rate possible even among low head-speed players. Lowering the spin rate by adjusting the amount of ball deflection in this way is the simplest approach for those skilled in the art. However, increasing the deflection is tantamount to making the ball correspondingly softer, which changes the feel of the ball at impact. For high head-speed golfers in particular, balls having a large deflection lack a solid feel on shots. Accordingly, there exists a desire for a golf ball which, even when the amount of deflection (deformation) is at or below a certain level, holds down the backspin rate and enables an increased flight distance to be achieved without an unpleasant feel at impact.

SUMMARY OF THE INVENTION

It is therefore an object of the present invention to provide a rubber composition for golf balls which can improve the flight performance of a golf ball by causing the ball to exhibit a low spin rate at the time of impact. A further object of the invention is to provide a golf ball in which such a rubber composition is used.

As a result of extensive investigations, I have discovered that by including (A) a base rubber, (B) an acrylate ester or methacrylate ester having an isocyanate group or a blocked isocyanate group, (C) diacrylic acid, dimethacrylic acid or a metal salt thereof, and (D) an organic peroxide as the essential ingredients in a rubber composition for golf balls, and using a molded and crosslinked form of this rubber composition as the core in a golf ball, the ball is able, surprisingly, to fully exhibit a low spin rate on shots. Although the reasons for this are not entirely clear, it is conceivable that including (B) an acrylate ester or methacrylate ester having an isocyanate group or a blocked isocyanate group within the core leads to the formation of a network structure composed of urethane bonds or urea bonds in the molecule, and that this singular molded and crosslinked material works effectively to lower the spin rate of the ball.

Accordingly, in a first aspect, the invention provides a rubber composition for golf balls which includes (A) a base rubber, (B) an acrylate ester or methacrylate ester containing an isocyanate group or a blocked isocyanate group, (C) diacrylic acid, dimethacrylic acid is or a metal salt thereof, and (D) an organic peroxide.

In a preferred embodiment of the rubber composition of the invention, component (B) is included in an amount of from 0.1 to 50 parts by weight per 100 parts by weight of the base rubber (A).

In another preferred embodiment of the inventive rubber composition, component (B) is a compound selected from the group consisting of 2-isocyanatoethyl methacrylate, 2-[0-(1'-methylpropylideneamino)carboxyamino]ethyl methacrylate and 2-[(3,5-dimethylpyrazolyl)carbonylamino]ethyl methacrylate.

In still another preferred embodiment of the inventive rubber composition, component (B) is included in a ratio with respect to the combined amount of components (B) and (C) of from 1 to 50 wt %.

In yet another preferred embodiment of the inventive rubber composition, a material molded under heat from the rubber composition is adapted for use as a golf ball core. The hot-molded material adapted for use as a golf ball core preferably has a deformation when compressed under a final load of 1,275 N (130 kgf) from an initial load state of 98 N (10 kgf) of from 2.0 to 4.0 mm.

In a second aspect, the invention provides a golf ball having a core and a cover of one or more layers which encases the core, wherein the core is formed of the rubber composition according to the first aspect of the invention.

In a preferred embodiment of the golf ball according to the second aspect of the invention, the cover consists of two layers: an outermost layer and an intermediate layer positioned between the outermost layer and the core, which intermediate layer has a material hardness on the Shore D hardness scale of from 62 to 74.

In another preferred embodiment of the golf ball according to the second aspect of the invention, the cover consists of two layers: an outermost layer and an intermediate layer positioned between the outermost layer and the core, which outermost layer has a material hardness on the Shore D hardness scale of from 25 to 60.

ADVANTAGEOUS EFFECTS OF THE INVENTION

When the inventive rubber composition for golf balls is used in a structural member of a golf ball, particularly the core, it exhibits a spin rate-lowering effect on golf ball shots and can thus improve the flight performance of the ball.

BRIEF DESCRIPTION OF THE DIAGRAMS

DETAILED DESCRIPTION OF THE INVENTION

Figure 1:
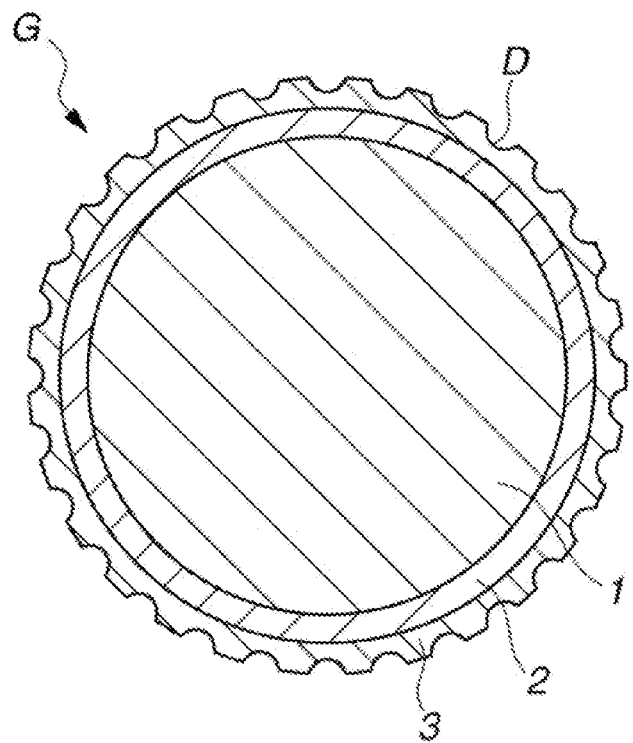
FIG. 1 is a schematic cross-sectional view of a golf ball according to one embodiment of the invention.

The objects, features and advantages of the invention will become more apparent from the following detailed description, taken in conjunction with the foregoing diagrams.

The rubber composition for golf balls of the invention is characterized by including the following components:

(A) a base rubber, (B) an acrylate ester or methacrylate ester containing an isocyanate group or a blocked isocyanate group, (C) diacrylic acid, dimethacrylic acid or a metal salt thereof, and (D) an organic peroxide.

The base rubber serving as component (A) is not particularly limited, although the use of polybutadiene is especially preferred.

It is desirable for the polybutadiene to have a cis-1,4-bond content on the polymer chain of at least 60 wt %, preferably at least 80%, more preferably at least 90 wt %, and most preferably at least 95 wt/o. At a cis-1,4-bond content among the bonds on the poly butadiene molecule that is too low, the rebound may decrease.

The polybutadiene has a content of 1,2-vinyl bonds on the polymer chain which is generally not more than 2 wt %, preferably not more than 1.7 wt %, and more preferably not more than 1.5 wt %. At a 1,2-vinyl bond content which is too high, the rebound may decrease.

The polybutadiene has a Mooney viscosity ($ML_{1+4}$ (100° C.)) of preferably at least 20, and more preferably at least 30. The upper limit is preferably not more than 120, more preferably not more than 100, and even more preferably not more than 80.

The term "Mooney viscosity" used herein refers to an industrial indicator of viscosity (JIS K 6300) measured with a Mooney viscometer, which is a type of rotary plastometer. This value is represented by the unit symbol MLU 4 (100° C.), wherein "M" stands for Mooney viscosity. "L" stands for large rotor (L-type) and "1+4" stands for a pre-heating time of 1 minute and a rotor rotation time of 4 minutes. The "100° C." indicates that measurement was carried out at a temperature of 100° C.

The polybutadiene used may be one synthesized with a rare-earth catalyst or a group VIII metal compound catalyst.

Polybutadiene rubbers synthesized with catalysts other than the above rare-earth catalysts may also be included in the base rubber. Other rubber ingredients such as styrene-butadiene rubber (SBR), natural rubber, polyisoprene rubber and ethylene-propylene-diene rubber (EPDM) may be included as well. These rubber ingredients may be used alone or two or more may be used in combination.

The polybutadiene accounts for a proportion of all the rubber in the rubber composition which is preferably at least 60 wt %, more preferably at least 70 wt %, and most preferably at least 90 wt %. It is also possible for 100 wt % of the base rubber, i.e., all of the base rubber, to be polybutadiene.

Component (B) is an acrylate ester or methacrylate ester which contains an isocyanate group or a blocked isocyanate group. By including (B) the acrylate ester or methacrylate ester which contains an isocyanate group or a blocked isocyanate group in the rubber composition containing the subsequently described component (C) diacrylic acid, dimethacrylic acid or a metal salt thereof, a copolymer of components (B) and (C) can be created. Moreover, the isocyanate groups that have been introduced into this copolymer, through reactions with compounds having active hydrogens, such as moisture included within the starting materials and carboxylic acids from the diacrylic acid or dimethacrylic acid, create urethane bonds and urea bonds within the molecule, forming a network structure having these bonds. It is thought that the golf ball core material which is a crosslinked and molded form of the rubber composition thus obtained works effectively to improve the spin properties of golf balls made therewith.

Because the isocyanate groups have a strong reactivity and easily react at normal temperatures with compounds having active hydrogens, they are readily subject to the influence of moisture in the air, such as during weighing of the starting materials and intensive mixing into the rubber composition. Hence, there are constraints on the heating temperature of the rubber composition as well as a number of problems, such as a lower degree of freedom in blending, the difficulty of obtaining a composition in which the compounding ingredients are uniform, and limitations on the handling time after mixing. These problems are often resolved by using a blocked isocyanate in which the active isocyanate group has been masked with a blocking agent. The deblocking temperature of the blocked isocyanate is influenced by a number of factors, including the isocyanate compound, blocking agent and catalyst and the amounts thereof, and also the presence or absence of compounds which react with the isocyanate.

Blocking agents that are commonly used include alcohols and phenols such as phenol, cresol and isononyl phenol, oximes such as methyl ethyl ketoxime, amides such as ε-caprolactam, lactams, amines, amides and β-dicarbonyl compounds such as diethyl malonate.

When a blocked isocyanate masked with the above blocking agent is used as component (B), the deblocking temperature of the blocked isocyanate is influenced by the bond strength between B and the carbonyl group in R—NHCO—B (BH being the blocking agent). The carbonyl carbon on the urethane is positively charged and B is negatively charged; the larger the difference in charge between these, the larger the bond strength, resulting in a higher deblocking temperature. The blocking agents are arranged below according to their deblocking temperatures:

alcohols>ε-caprolactam>phenols>oximes>active methylene compounds.

A commercial product may be used as component (B). Illustrative examples include 2-isocyanatoethyl methacrylate (available as "Karenz MOI™" from Showa Denko K.K.), 2-[(3,5-dimethylpyrazolyl)carbonylamino]ethyl methacrylate (available as "Karenz MOI-BP™" from Showa Denko K.K.) and 2-[0-(1'-methylpropylideneamino) carboxyamino]ethyl methacrylate (available as "Karenz MOI-BM™" from Showa Denko K.K.).

The content of component (B), from the standpoint of the spin rate-lowering effect and the ball durability, is preferably from 0.1 to 50 parts by weight, and more preferably from 0.3 to 25 parts by weight, per 100 parts by weight of component (A) serving as the base resin. At a content higher than this range, the ball durability may worsen and the ball may crack more easily; on the other hand, at a content lower than this range, a spin rate-lowering effect may not be obtained.

Component (B) is included in a ratio with respect to the combined amount of components (B) and (C) that is preferably in the range of 1 to 50 wt %, and more preferably in the range of 2 to 30 wt %. The reason for this range is that, although the base rubber is cured by components (B) and (C), component (C) has a better ability as a curing agent. Hence, when the ratio of component (B) is increased, the amount of components (B) and (C) required to cure the base rubber rises. This fact sometimes has a disadvantageous effect on the core durability. On the other hand, when the ratio of component (B) is too low, a spin rate-lowering effect may not be obtainable.

Component (C) is diacrylic acid, dimethacrylic acid or a metal salt thereof. These are known to be commonly used as co-crosslinking agents for the base rubber in rubber compositions such as for golf ball cores. Specific examples of the metal salts of diacrylic acid and dimethacrylic acid include zinc, sodium, magnesium, calcium and aluminum salts. The zinc salts are especially preferred. Therefore, the co-crosslinking agent is most preferably zinc diacrylate or zinc dimethacrylate.

The diacrylic acid, methacrylic acid or metal salt thereof of component (C) has an average particle size of preferably from 3 to 30 μm, more preferably from 5 to 25 μm, and even more preferably from 8 to 15 μm. At an average particle size below 3 μm, this component tends to agglomerate within the rubber composition, the reactivity between molecules of acrylic acid rises and the reactivity between molecules of the base rubber decreases, as a result of which a sufficient golf ball rebound performance may not be obtainable. On the other hand, at a co-crosslinking agent average particle size in excess of 30 μm, the particles of co-crosslinking agent become too large and the variability in the properties of the resulting golf ball increases.

The content of component (C) per 100 parts by weight of the base rubber serving as component (A) is preferably at least 10 parts by weight, more preferably at least 15 parts by weight, and even more preferably at least 20 parts by weight. The upper limit is preferably not more than 65 parts by weight, more preferably not more than 60 parts by weight, and even more preferably not more than 55 parts by weight. When the content is lower than the above range, the ball may become too soft and have a poor rebound; when the content is higher than the above range, the ball may become too hard, resulting in a poor feel at impact, and may be brittle, resulting in an inferior durability.

Component (D) is an organic peroxide. It is especially desirable to use an organic peroxide having a one-minute half-life temperature of between 110 and 185° C. Examples of such organic peroxides include dicunyl peroxide ("Percumyl® D" from NOF Corporation), 2,5-dimethyl-2,5-di(t-butylperoxy)hexane ("Perhexa® 25B" from NOF Corporation) and di(2-t-butylperoxyisopropyl)benzene ("Perbutyl® P" from NOF Corporation). Preferred use can be made of dicumyl peroxide. Other suitable commercial products include those available as "Perhexa® C-40", "Niper BW" and "Peroyl® L" (all from NOF Corporation), and "Luperco 231XL" (from AtoChem Co.). One of these may be used alone, or two or more may be used in combination.

The content of component (D) per 100 parts by weight of the base rubber is preferably at least 0.1 part by weight, and more preferably at least 0.3 part by weight. The upper limit is preferably not more than 5 parts by weight, more preferably not more than 4 parts by weight, and even more preferably not more than 3 parts by weight.

In addition to above components (A) to (D), various additives such as fillers, antioxidants and organosulfur compounds may also be included, insofar as doing so does not detract from the advantageous effects of the invention.

Fillers that may be suitably used include zinc oxide, barium sulfate and calcium carbonate. These may be of one type used alone, or two or more may be used together. The amount of filler included per 100 parts by weight of the base rubber is preferably at least 1 part by weight, more preferably at least 3 parts by weight, and even more preferably at least 5 parts by weight. The upper limit per 100 parts by weight of the base rubber is preferably not more than 100 parts by weight, more preferably not more than 60 parts by weight, and even more preferably not more than 40 parts by weight. When too much or too little filler is included, it may not be possible to obtain a proper weight and a suitable rebound.

Examples of antioxidants that may be used include, without particular limitation, phenol-type antioxidants such as 2,2-methylenebis(4-methyl-6-tert-butyl phenol), 4,4-butylidenebis(3-methyl-6-tert-butyl phenol) and 2,2-methylenebis(4-ethyl-6-tert-butyl phenol). Examples of commercial products that may be used include "Nocrac NS-6", "Nocrac NS-30" and "Nocrac NS-5" (all available from Ouchi Shinko Chemical Industry Co., Ltd). These may be of one type used alone, or two or more types may be used together. The amount of antioxidant included per 100 parts by weight of the base rubber, although not particularly limited, is preferably at least 0.05 part by weight, and more preferably at least 0.1 part by weight. The upper limit is preferably not more than 1.0 part by weight, more preferably not more than 0.7 part by weight, and even more preferably not more than 0.4 part by weight. When too much or too little antioxidant is included, it may not be possible to obtain a proper core hardness gradient, which may make it impossible to obtain a suitable rebound, durability, and spin rate-lowering effect on full shots.

Exemplary organosulfur compounds include, without particular limitation, thiophenols, thionaphthols, diphenyl polysulfides, halogenated thiophenols, and metal salts of these. Specific examples include the zinc salts of pentachlorothiophenol, pentafluorothiophenol, pentabromothiophenol and parachlorothiophenol, and also diphenylpolysulfides, dibenzylpolysulfides, dibenzoylpolysulfides, dibenzothiazoylpolysulfides and dithiobenzoylpolysulfides having from 2 to 4 sulfurs. One of these may be used alone or two or more may be used together. Of these, the use of the zinc salt of pentachlorothiophenol and/or diphenyldisulfide is especially preferred.

It is recommended that the amount of organosulfur compound included per 100 parts by weight of the base rubber be preferably at least 0.05 part by weight, more preferably at least 0.1 part by weight, and even more preferably at least 0.2 part by weight; and that the upper limit be preferably not more than 3 parts by weight, more preferably not more than 2 parts by weight, and even more preferably not more than 1 part by weight. When the organosulfur compound content is too high, the hardness of the hot-molded material may become too low. On the other hand, when this content is too low, an increased golf ball rebound is unlikely to be obtained.

A crosslinked and molded material can be produced by curing the rubber composition containing the above components under applied heat. For example, the crosslinked and molded material can be produced by intensively mixing the rubber composition using a mixing apparatus such as a Banbury mixer or a roll mill, compression molding or injection molding the mixed composition in a core mold, and then curing the molded rubber composition by heating it under conditions sufficient for the organic peroxide or co-crosslinking agent to act, namely, at a temperature of between about 100° C. and about 200° C. for about 10 to about 40 minutes.

Because the inventive rubber composition is formulated as described above, by using this rubber molding that has been cured under applied heat as the golf ball core, the golf ball spin rate-lowering effect on full shots with a driver can be increased.

It is recommended that the core (hot-molded material) have a deflection (deformation) when compressed under a final load of 1,275 N (130 kgf) from an initial load state of 98 N (10 kgf) which, although not particularly limited, is preferably at least 2.0 mm, and more preferably at least 2.3 mm, and which is preferably not more than 5.0 mm, and more preferably not more than 4.0 mm. When this value is too large, the core may become too soft, as a result of which a sufficient spin rate-lowering effect may not be obtained and the ball rebound may decrease. When this value is too small, a spin rate-lowering effect may not be obtained and the feel of the ball at impact may be too hard.

The core diameter, which is not particularly limited and depends also on the layer structure of the golf ball to be produced, is preferably at least 20 mm, and more preferably at least 25 mm. The upper limit is preferably not more than 41 mm, and more preferably not more than 40 mm. At a core diameter outside of this range, the initial velocity of the ball may decrease or a suitable spin performance may not be obtained.

As noted above, the above rubber composition is preferably used as a golf ball core. The golf ball of the invention has a structure which includes a core and a cover of one or more layers. When the cover is a multi-layer cover, the cover construction preferably consists of two layers: an outermost layer and an intermediate layer positioned between the outermost layer and the core. For example, as shown in FIG. 1, the golf ball G may have a core 1, an intermediate layer 2 encasing the core 1, and an outermost layer 3 encasing the intermediate layer 2. The outermost layer 3 is positioned as, with the exception of a coating layer, the outermost layer in the layer structure of the golf ball. The surface of the outermost layer 3 typically has numerous dimples D formed thereon to enhance the aerodynamic properties of the ball. Although not shown in the diagram, a coating layer is generally formed on the surface of the outermost layer 3.

Next, the cover of one or more layers encasing the core is described.

The cover material is not particularly limited, known materials such as various types of ionomer resins and urethane elastomers that are used in golf balls may be employed.

To better achieve a ball spin rate-lowering effect, it is especially preferable to use an ionomeric material in the layer adjoining the core. Specifically, the use of a commercial ionomer resin or a resin mixture that includes components (i) to (iv) below is preferred.

The resin mixture includes:
100 parts by weight of a resin component composed of, in admixture,
(i) a base resin of (i-1) an olefin-unsaturated carboxylic acid random copolymer and/or a metal ion neutralization product of an olefin-unsaturated carboxylic acid random copolymer mixed with (i-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and
(ii) a non-ionomeric thermoplastic elastomer
in a weight ratio between 100:0 and 50:50;
(iii) from 5 to 80 parts by weight of a fatty acid and/or fatty acid derivative having a molecular weight of from 228 to 1,500; and
(iv) from 0.1 to 17 parts by weight of a basic inorganic metal compound capable of neutralizing unneutralized acid groups in components (i) and (iii).
In particular, when using a mixed material of components (i) to (iv), it is preferable to employ one in which at least 70% of the acid groups are neutralized.

It is desirable for the material of the outermost layer of the cover to be composed chiefly of a urethane material, especially a thermoplastic urethane elastomer.

In addition, one or more cover layer (intermediate layer) may be formed between the layer adjoining the core and the outermost cover layer. In this case, it is preferable to use a thermoplastic resin such as an ionomer as the intermediate layer material.

The method used to obtain the cover in this invention may be, for example, a method in which, depending on the type of ball being produced, a pre-fabricated single-layer core or multilayer core of two or more layers is placed in a mold and the above mixture is mixed and melted under heating and then injection-molded over the core, thereby encasing the core with the desired cover. Another method that may be used to form the cover involves first molding the cover material into a pair of hemispherical half-cups, enclosing the core with these half-cups, and then molding under applied pressure at between 120° C. and 170° C. for 1 to 5 minutes.

When the cover consists of a single layer, the cover thickness may be set to from 0.3 to 3 mm. When the cover consists of two layers, the thickness of the outermost layer may be set to from 0.3 to 2.0 mm and the thickness of the intermediate layer may be set to from 0.3 to 2.0 mm.

The Shore D hardnesses of the respective layers making up the cover (cover layers) are not particularly limited. When the cover is a single-layer cover, the hardness is preferably at least 40, and more preferably at least 45. The upper limit is preferably not more than 70, and more preferably not more than 65.

When the cover consists of two layers, that is, an outermost layer and an intermediate layer positioned between the outermost layer and the core, the material hardness of the intermediate layer on the Shore D hardness scale is set to preferably at least 62, and more preferably at least 68, with the upper limit being preferably not more than 74, and more preferably not more than 72. The material hardness of the outermost layer on the Shore D hardness scale is set to preferably at least 25, with the upper limit being preferably not more than 60 and more preferably not more than 50. That is, when the cover consists of an outermost layer and an intermediate layer, it is preferable for the material hardness of the intermediate layer to be higher than the material hardness of the outermost layer.

Numerous dimples are formed on the surface of the outermost layer of the cover. Also, various types of treatment, such as surface preparation, stamping and painting, may be carried out on the cover. In particular, when such surface treatment is administered to the cover formed of the foregoing cover material, because the moldability at the cover surface is good, these operations can be efficiently carried out.

EXAMPLES

The following Examples and Comparative Examples are provided to illustrate the invention, and are not intended to limit the scope thereof.

Examples 1 to 12, Comparative Examples 1 to 9

Cores having a diameter of 38.65 mm were produced by using the polybutadiene and other core ingredients shown in Table 1 below to prepare core compositions of the seven rubber formulations C1 to C7, vulcanizing the resulting compositions at 155° C. for 15 minutes, and abrading the surfaces of the vulcanized cores.

2-Isocyanatoethyl methacrylate: Available as "Karenz MOI™" from Showa Denko K.K.
Zinc diacrylate: Available from Nippon Shokubai Co., Ltd.
Organic peroxide (1): Dicumyl peroxide, available as "Percumyl® D" from NOF Corporation
Organic peroxide (2): A mixture of 1,1-di(t-butylperoxy) cyclohexane and silica, available as "Perhexa® C-40" from NOF Corporation
Antioxidant: Available under the trade name "Nocrac NS6" from Ouchi Shinko Chemical Industry Co., Ltd.
Zinc oxide: Available from Sakai Chemical Co., Ltd.

Formation of Cover Layers (Intermediate Layer and Outermost Layer

Next, using the resin materials M1 to M3 formulated as shown in Table 2 below, an intermediate layer having a thickness of 1.2 mm was injection-molded over each core obtained as described above, thereby producing intermediate layer-encased spheres. Using the resin material O1 common to all of the Examples, an outermost layer having a thickness of 1.0 mm was then injection-molded over the intermediate layer-encased sphere, thereby producing three-piece golf balls. Although not shown in the diagram, dimples common to all of the Examples were formed at this time on the surface of the cover in each Example and Comparative Example.

TABLE 2

| Intermediate layer/cover materials (amounts in pbw) | M1 | M2 | M3 | O1 |
|---|---|---|---|---|
| Himilan ® AM7318 | 50 | | | |
| Himilan ® 1706 | 50 | | | |
| Himilan ® AM7939 | | 100 | | |
| Himilan ® AM7938 | | | 100 | |
| TPU | | | | 100 |
| Material hardness (Shore D) | 66 | 71 | 70 | 47 |

Details on the compounding ingredients in the above table are given below.
Himilan® AM7318: A sodium ionomer available from Dow-Mitsui Polychemicals Co., Ltd.
Himilan® 1706: A zinc ionomer available from Dow-Mitsui Polychemicals Co., Ltd.
Himilan® AM7939: An ionomer available from Dow-Mitsui Polychemicals Co., Ltd.
Himilan® AM7938: An ionomer available from Dow-Mitsui Polychemicals Co., Ltd.

TABLE 1

| Core type (amounts in pbw) | | C1 | C2 | C3 | C4 | C5 | C6 | C7 |
|---|---|---|---|---|---|---|---|---|
| (A) | cis-1,4-Polybutadiene | 100 | 100 | 100 | 100 | 100 | 100 | 100 |
| (B) | 2-Isocyanatoethyl methacrylate | | | | 1.0 | 5.0 | 1.0 | 3.0 |
| (C) | Zinc diacrylate | 25.0 | 30.0 | 33.0 | 25.0 | 25.0 | 30.0 | 30.0 |
| (D) | Organic peroxide (1) | 0.6 | 0.6 | 0.6 | 0.6 | 0.6 | 0.6 | 0.6 |
| | Organic peroxide (2) | 0.6 | 0.6 | 0.6 | 0.6 | 0.6 | 0.6 | 0.6 |
| Others | Antioxidant | 0.1 | 0.1 | 0.1 | 0.1 | 0.1 | 0.1 | 0.1 |
| | Zinc oxide | suitable amount | suitable amount | suitable amount | suitable amount | suitable amount | suitable amount | suitable amount |
| Ratio of component (B) included relative to combined amount of components (B) and (C), % | | — | — | — | 3.8 | 16.7 | 3.2 | 9.1 |

Details on these core materials are given below.
cis-1,4-Polybutadiene: Available under the trade name "BR01" from JSR Corporation.

TPU: An ether-type thermoplastic polyurethane (Shore D hardness, 47) available from DIC Covestro Polymer, Ltd.

The spin rates on driver shots for the resulting golf balls were evaluated by the method described below. The results are shown in Tables 3, 4 and 5. In addition, the core and ball deflections (mm) were measured as described below.

Spin Rate on Driver Shots

A driver (W #1) was mounted on a golf swing robot and the spin rate of the ball immediately after impact at a head speed of 45 m/s was measured with an apparatus for measuring the initial conditions. The club used was the TourB XD-3 driver (2016 model, loft angle, 9.5°) manufactured by Bridgestone Sports Co., Ltd.

Compressive Hardnesses of Core and Ball

The core or ball was placed on a hard plate and the deflection when compressed under a final load of 1,275 N (130 kgf) from an initial load state of 98 N (10 kgf) was measured. The deflection in each case is a measured value obtained after holding the core or ball isothermally at 23.9° C.

Material Hardness of Intermediate Layer and Outermost Layer (Shore D Hardness)

The resin materials for the intermediate layer and the outermost layer were formed into 2 mm thick sheets and left to stand for at least two weeks, following which the Shore D hardness was measured in accordance with ASTM D2240-95.

TABLE 3

| | | Comparative Example | | | Example | | | |
|---|---|---|---|---|---|---|---|---|
| | | 1 | 2 | 3 | 1 | 2 | 3 | 4 |
| Core | Material (type) | C1 | C2 | C3 | C4 | C5 | C6 | C7 |
| | Diameter (mm) | 38.65 | 38.65 | 38.65 | 38.65 | 38.65 | 38.65 | 38.65 |
| | Weight (g) | 35.1 | 35.1 | 35.1 | 35.1 | 35.1 | 35.1 | 35.1 |
| | Compressive deformation (mm) | 3.5 | 2.7 | 2.5 | 3.5 | 2.7 | 2.9 | 2.6 |
| Intermediate layer | Material (type) | M1 | M1 | M1 | M1 | M1 | M1 | M1 |
| | Diameter (mm) | 41.05 | 41.05 | 41.05 | 41.05 | 41.05 | 41.05 | 41.05 |
| | Weight (g) | 40.65 | 40.65 | 40.65 | 40.65 | 40.65 | 40.65 | 40.65 |
| Outermost layer | Material (type) | O1 | O1 | O1 | O1 | O1 | O1 | O1 |
| | Diameter (mm) | 42.7 | 42.7 | 42.7 | 42.7 | 42.7 | 42.7 | 42.7 |
| | Weight (g) | 45.3 | 45.3 | 45.3 | 45.3 | 45.3 | 45.3 | 45.3 |
| | Compressive deformation (mm) | 2.7 | 2.3 | 2.1 | 2.9 | 2.3 | 2.5 | 2.2 |
| Evaluation | Initial velocity (m/s) | 66.0 | 66.6 | 66.8 | 66.0 | 66.6 | 66.1 | 66.6 |
| | Launch angle (°) | 11.1 | 10.8 | 11.0 | 11.0 | 10.8 | 10.9 | 11.0 |
| | Backspin rate (rpm) | 3,000 | 3,150 | 3,100 | 2,900 | 3,000 | 2,950 | 3,000 |

TABLE 4

| | | Comparative Example | | | Example | | | |
|---|---|---|---|---|---|---|---|---|
| | | 4 | 5 | 6 | 5 | 6 | 7 | 8 |
| Core | Material (type) | C1 | C2 | C3 | C4 | C5 | C6 | C7 |
| | Diameter (mm) | 38.65 | 38.65 | 38.65 | 38.65 | 38.65 | 38.65 | 38.65 |
| | Weight (g) | 35.1 | 35.1 | 35.1 | 35.1 | 35.1 | 35.1 | 35.1 |
| | Compressive deformation (mm) | 3.5 | 2.7 | 2.5 | 3.5 | 2.7 | 2.9 | 2.6 |
| Intermediate layer | Material (type) | M2 | M2 | M2 | M2 | M2 | M2 | M2 |
| | Diameter (mm) | 41.05 | 41.05 | 41.05 | 41.05 | 41.05 | 41.05 | 41.05 |
| | Weight (g) | 40.65 | 40.65 | 40.65 | 40.65 | 40.65 | 40.65 | 40.65 |
| Outermost layer | Material (type) | O1 | O1 | O1 | O1 | O1 | O1 | O1 |
| | Diameter (mm) | 42.7 | 42.7 | 42.7 | 42.7 | 42.7 | 42.7 | 42.7 |
| | Weight (g) | 45.3 | 45.3 | 45.3 | 45.3 | 45.3 | 45.3 | 45.3 |
| | Compressive deformation (mm) | 2.6 | 2.2 | 2.1 | 2.8 | 2.2 | 2.4 | 2.1 |
| Evaluation | Initial velocity (m/s) | 66.0 | 66.6 | 66.8 | 66.0 | 66.6 | 66.1 | 66.6 |
| | Launch angle (°) | 11.1 | 10.8 | 10.9 | 11.0 | 10.8 | 10.9 | 10.9 |
| | Backspin rate (rpm) | 2,900 | 3,000 | 3,000 | 2,800 | 2,900 | 2,850 | 2,900 |

TABLE 5

| | | Comparative Example | | | Example | | | |
|---|---|---|---|---|---|---|---|---|
| | | 7 | 8 | 9 | 9 | 10 | 11 | 12 |
| Core | Material (type) | C1 | C2 | C3 | C4 | C5 | C6 | C7 |
| | Diameter (mm) | 38.65 | 38.65 | 38.65 | 38.65 | 38.65 | 38.65 | 38.65 |
| | Weight (g) | 35.1 | 35.1 | 35.1 | 35.1 | 35.1 | 35.1 | 35.1 |
| | Compressive deformation (mm) | 3.5 | 2.7 | 2.5 | 3.5 | 2.7 | 2.9 | 2.6 |

TABLE 5-continued

|  |  | Comparative Example | | | Example | | | |
| --- | --- | --- | --- | --- | --- | --- | --- | --- |
|  |  | 7 | 8 | 9 | 9 | 10 | 11 | 12 |
| Intermediate layer | Material (type) | M3 | M3 | M3 | M3 | M3 | M3 | M3 |
|  | Diameter (mm) | 41.05 | 41.05 | 41.05 | 41.05 | 41.05 | 41.05 | 41.05 |
|  | Weight (g) | 40.65 | 40.65 | 40.65 | 40.65 | 40.65 | 40.65 | 40.65 |
| Outermost layer | Material (type) | O1 | O1 | O1 | O1 | O1 | O1 | O1 |
|  | Diameter (mm) | 42.7 | 42.7 | 42.7 | 42.7 | 42.7 | 42.7 | 42.7 |
|  | Weight (g) | 45.3 | 45.3 | 45.3 | 45.3 | 45.3 | 45.3 | 45.3 |
|  | Compressive deformation (mm) | 2.6 | 2.3 | 2.1 | 2.8 | 2.2 | 2.4 | 2.2 |
| Evaluation | Initial velocity (m/s) | 66.0 | 66.6 | 66.8 | 66.0 | 66.6 | 66.1 | 66.6 |
|  | Launch angle (°) | 11.1 | 10.8 | 10.9 | 11.0 | 10.8 | 10.9 | 10.9 |
|  | Backspin rate (rpm) | 2,800 | 2,850 | 2,900 | 2,700 | 2,750 | 2,750 | 2,800 |

Figure 2:
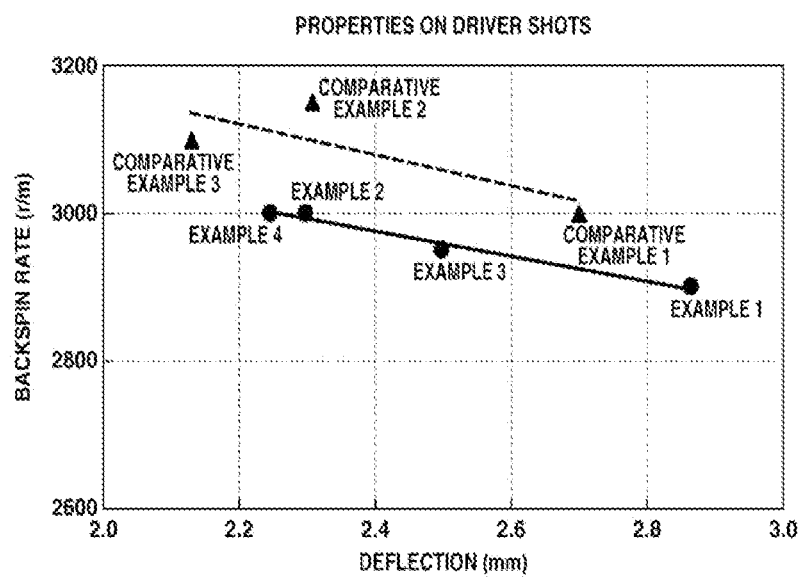
FIG. 2 is a graph showing, in Examples 1 to 4 and Comparative Examples 1 to 3, the relationship between the ball deflection under specific loading and the amount of backspin by the ball when hit with a driver.
Figure 3:
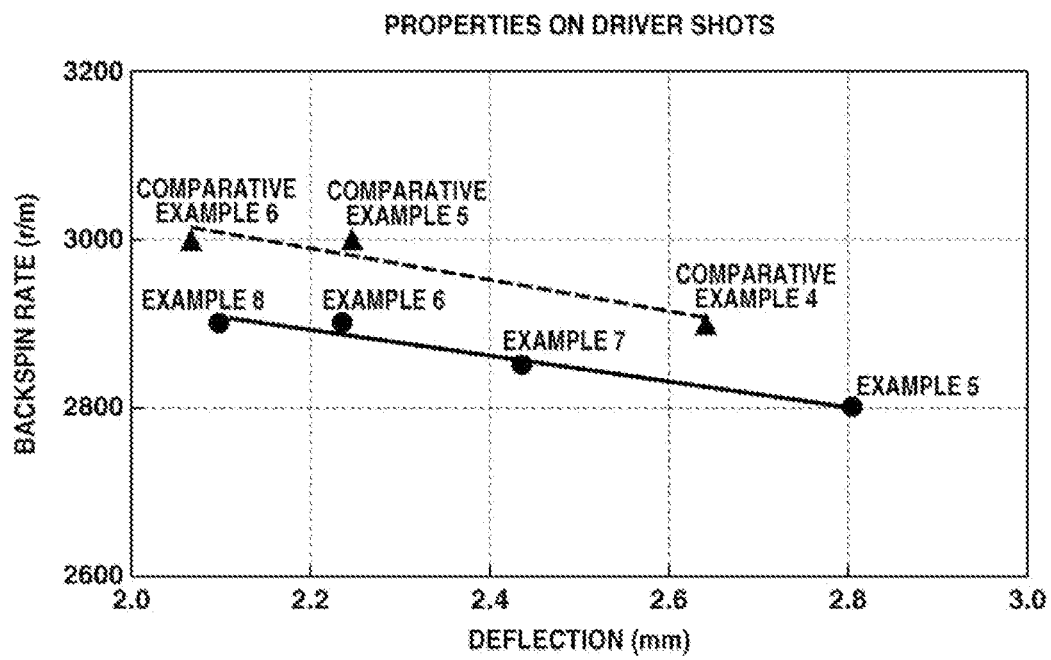
FIG. 3 is a graph showing, in Examples 5 to 8 and Comparative Examples 4 to 6, the relationship between the ball deflection under specific loading and the amount of backspin by the ball when hit with a driver.
Figure 4:
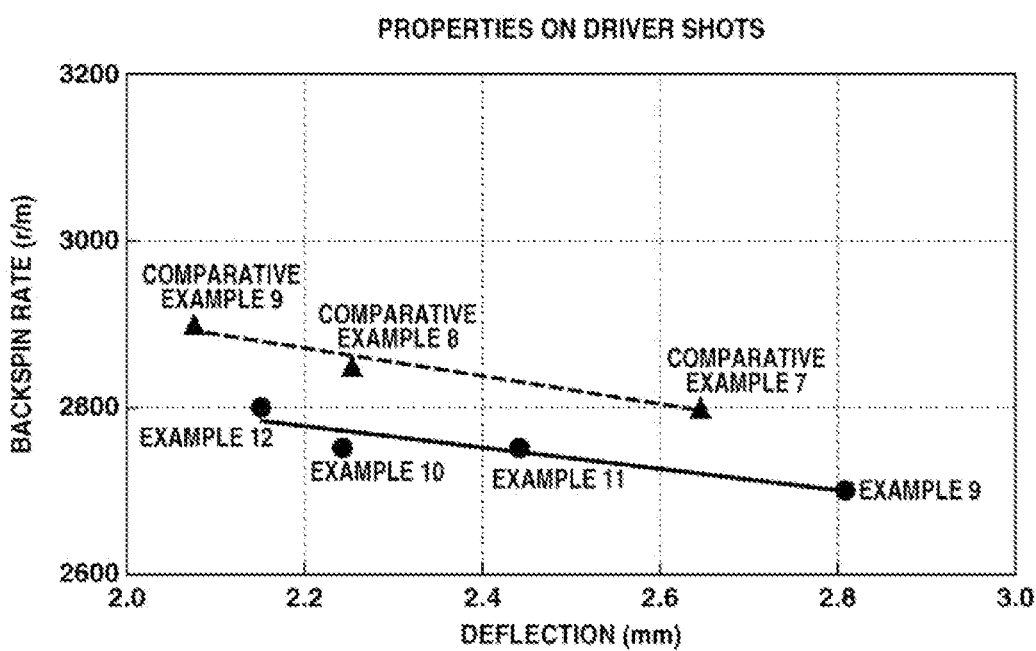
FIG. 4 is a graph showing, in Examples 9 to 12 and Comparative Examples 7 to 9, the relationship between the ball deflection under specific loading and the amount of backspin by the ball when hit with a driver.

The following observations were made concerning the ball performance in the Examples in Tables 3 to 5 while referring to the graphs in FIGS. 2 to 4.

With regard to golf balls in which M1 was used as the intermediate layer material, in cases where the core deflection was the same, as shown in FIG. 2, the backspin rate on driver shots was always smaller in cores formulated with component (B) in the manner of Examples 1 to 4 than in cores formulated without component (B) in the manner of Comparative Examples 1 to 3.

With regard to golf balls in which M2 was used as the intermediate layer material, in cases where the core deflection was the same, as shown in FIG. 3, the backspin rate on driver shots was always smaller in cores formulated with component (B) in the manner of Examples 5 to 8 than in cores formulated without component (B) in the manner of Comparative Examples 4 to 6.

With regard to golf balls in which M3 was used as the intermediate layer material, in cases where the core deflection was the same, as shown in FIG. 4, the backspin rate on driver shots was always smaller in cores formulated with component (B) in the manner of Examples 9 to 12 than in cores formulated without component (B) in the manner of Comparative Examples 7 to 9.

It is thus apparent that, as indicated above, regardless of the intermediate layer material or hardness, in cases where the core deflection is the same, a core formulated with component (B) can achieve a better ball spin rate-lowering effect than a core formulated without component (B), resulting in a good flight performance.

Japanese Patent Application No. 2020-107913 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover of one or more layers which encases the core, wherein the core is formed of the rubber composition comprising:
   (A) a base rubber,
   (B) an acrylate ester or methacrylate ester containing an isocyanate group or a blocked isocyanate group,
   (C) diacrylic acid, dimethacrylic acid or a metal salt thereof, and
   (D) an organic peroxide, and
   wherein component (B) is a compound selected from the group consisting of 2-isocyanatoethyl methacrylate, 2-[0-(1'-methylpropylideneamino)carboxyamino]ethyl methacrylate and 2-[(3,5-dimethylpyrazolyl)carbonylamino]ethyl methacrylate.

2. The golf ball of claim 1, wherein the cover consists of two layers: an outermost layer and an intermediate layer positioned between the outermost layer and the core, which intermediate layer has a material hardness on the Shore D hardness scale of from 62 to 74.

3. The golf ball of claim 1, wherein the cover consists of two layers: an outermost layer and an intermediate layer positioned between the outermost layer and the core, which outermost layer has a material hardness on the Shore D hardness scale of from 25 to 60.

4. The golf ball of claim 1, wherein component (B) is included in an amount of from 0.1 to 50 parts by weight per 100 parts by weight of the base rubber (A).

5. The golf ball of claim 1, wherein component (B) is included in a ratio with respect to the combined amount of components (B) and (C) of from 1 to 50 wt %.

6. The golf ball of claim 1, wherein the hot-molded material adapted for use as a golf ball core has a deformation when compressed under a final load of 1,275 N (130 kgf) from an initial load state of 98 N (10 kgf) of from 2.0 to 4.0 mm.

* * * * *